(12) United States Patent
Godbole et al.

(10) Patent No.: US 11,379,118 B2
(45) Date of Patent: Jul. 5, 2022

(54) METHOD AND SYSTEM FOR STORAGE LOAD BALANCING BASED ON VIRTUAL SYNTHETICS METADATA

(71) Applicant: EMC IP Holding Company LLC, Hopkinton, MA (US)

(72) Inventors: Kedar Sadanand Godbole, Pune (IN); Nitin Madan, Cupertino, CA (US); Srikant Viswanathan, Pune (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 67 days.

(21) Appl. No.: 17/081,743

(22) Filed: Oct. 27, 2020

(65) Prior Publication Data
US 2022/0129157 A1 Apr. 28, 2022

(51) Int. Cl.
*G06F 3/06* (2006.01)
(52) U.S. Cl.
CPC ............ *G06F 3/0604* (2013.01); *G06F 3/067* (2013.01); *G06F 3/0652* (2013.01)
(58) Field of Classification Search
None
See application file for complete search history.

(56) References Cited

U.S. PATENT DOCUMENTS

| 11,016,955 B2* | 5/2021 | Tofano | G06F 16/134 |
| 2015/0106578 A1* | 4/2015 | Warfield | G06F 3/0653 |
| | | | 711/158 |

OTHER PUBLICATIONS

Bassiouny et al., "Backup Optimizaiton 'Networker Inside'", (c) 2014 EMC Proven Professional Knowledge Sharing, p. 1-35.*

* cited by examiner

*Primary Examiner* — Brian R Peugh
(74) *Attorney, Agent, or Firm* — Chamberlain, Hrdlicka, White, Williams & Aughtry (57) ABSTRACT

A method and system for storage load balancing based on virtual synthetics metadata. When storing data onto a storage cluster, data submitted thereto may often be distributed unevenly across the constituent storage nodes thereof. To address the issue, some form of load balancing (or re-distribution of data) across the storage nodes may be implemented. Existing load balancing techniques, however, tend to migrate data between storage nodes without consideration for the efficient utilization of available storage space on the storage node where the data ends up (or destination storage node). Accordingly, the disclosed method and system propose a load balancing mechanism whereby the migrated data dedupes well, thereby securing the efficient consumption of storage space on the destination storage node.

20 Claims, 6 Drawing Sheets

METHOD AND SYSTEM FOR STORAGE LOAD BALANCING BASED ON VIRTUAL SYNTHETICS METADATA

BACKGROUND

When storing data onto a storage cluster, data submitted thereto may often be distributed unevenly across the constituent storage nodes thereof. To address the issue, some form of load balancing (or re-distribution of data) across the storage nodes may be implemented.

SUMMARY

In general, in one aspect, the invention relates to a method for storage load balancing between storage nodes. The method includes monitoring a storage utilization on a source storage node, making a first determination that the storage utilization at least meets a warning threshold, generating, based on the first determination and from virtual synthetics metadata, a relationship graph for files maintained on the source storage node, identifying a first subset of the files based on the relationship graph, and migrating the first subset of the files to a destination storage node.

In general, in one aspect, the invention relates to a non-transitory computer readable medium (CRM). The non-transitory CRM includes computer readable program code, which when executed by a computer processor, enables the computer processor to monitor a storage utilization on a source storage node, make a first determination that the storage utilization at least meets a warning threshold, generate, based on the first determination and from virtual synthetics metadata, a relationship graph for files maintained on the source storage node, identify a first subset of the files based on the relationship graph, and migrate the first subset of the files to a destination storage node.

In general, in one aspect, the invention relates to a system. The system includes a plurality of storage nodes, including a destination storage node, and a source storage node operatively connected to the destination storage node. The source storage node includes a computer processor, wherein a data migration agent executes on the computer processor and is programmed to monitor a storage utilization on the source storage node, make a first determination that the storage utilization at least meets a warning threshold, generate, based on the first determination and from virtual synthetics metadata, a relationship graph for files maintained on the source storage node, identify a first subset of the files based on the relationship graph, and migrate the first subset of the files to the destination storage node.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for storage load balancing based on virtual synthetics metadata. When storing data onto a storage cluster, data submitted thereto may often be distributed unevenly across the constituent storage nodes thereof. To address the issue, some form of load balancing (or re-distribution of data) across the storage nodes may be implemented. Existing load balancing techniques, however, tend to migrate data between storage nodes without consideration for the efficient utilization of available storage space on the storage node where the data ends up (or destination storage node). Accordingly, the disclosed method and system propose a load balancing mechanism whereby the migrated data dedupes well, thereby securing the efficient consumption of storage space on the destination storage node.

Towards identifying one or more data sets, to migrate from a source storage node to a destination storage node, which dedupe well, the disclosed method and system examines virtual synthetics metadata (if any) associated with the data. Through virtual synthetics, data (or files) may be defined, stored, and thus recovered, at least in part, using pointers to data blocks (or file segments) from other data (or files) maintained on the source storage node. Virtual synthetics metadata, accordingly, includes information describing which data blocks (or file segments) of given data (or a given file) map to data blocks (or file segments) from one or more other data (or files). From such virtual synthetics metadata, the disclosed method and system further derives or generates a relationship graph, composed of one or more sub-graphs, to distinguish, and thus migrate, data (or file) sets that dedupe well onto one or more destination storage nodes.

Data deduplication may refer to a data compression technique directed to eliminating duplicate (or redundant) blocks of data, which thereby reduces storage overhead. The effectiveness of data deduplication on data may be quantified through a data deduplication ratio, which may refer to a measurement of the original size (in bytes) of the data versus a resulting size (in bytes) of the data after removing any redundancy. By way of examples, a 10:1 data deduplication ratio eliminates 90% of the data size, whereas a 100:1 data deduplication ratio eliminates 99% of the data size. Accordingly, the higher the data deduplication ratio, the more effective the data deduplication process on the impacted data. Other factors, however, may influence the effectiveness of data deduplication on a given set of data, including, but not limited to: the data type of the data (i.e., format of the data), the change rate of the data, the retention period of the data, and location scope of the data (i.e., single or multiple storage system(s)). Further, a set of data (or files) that may dedupe well may refer to data (or files) that, at least in part, share one or more redundant data blocks (or file segments) and, consequently, yield high storage capacity savings.

Figure 1:
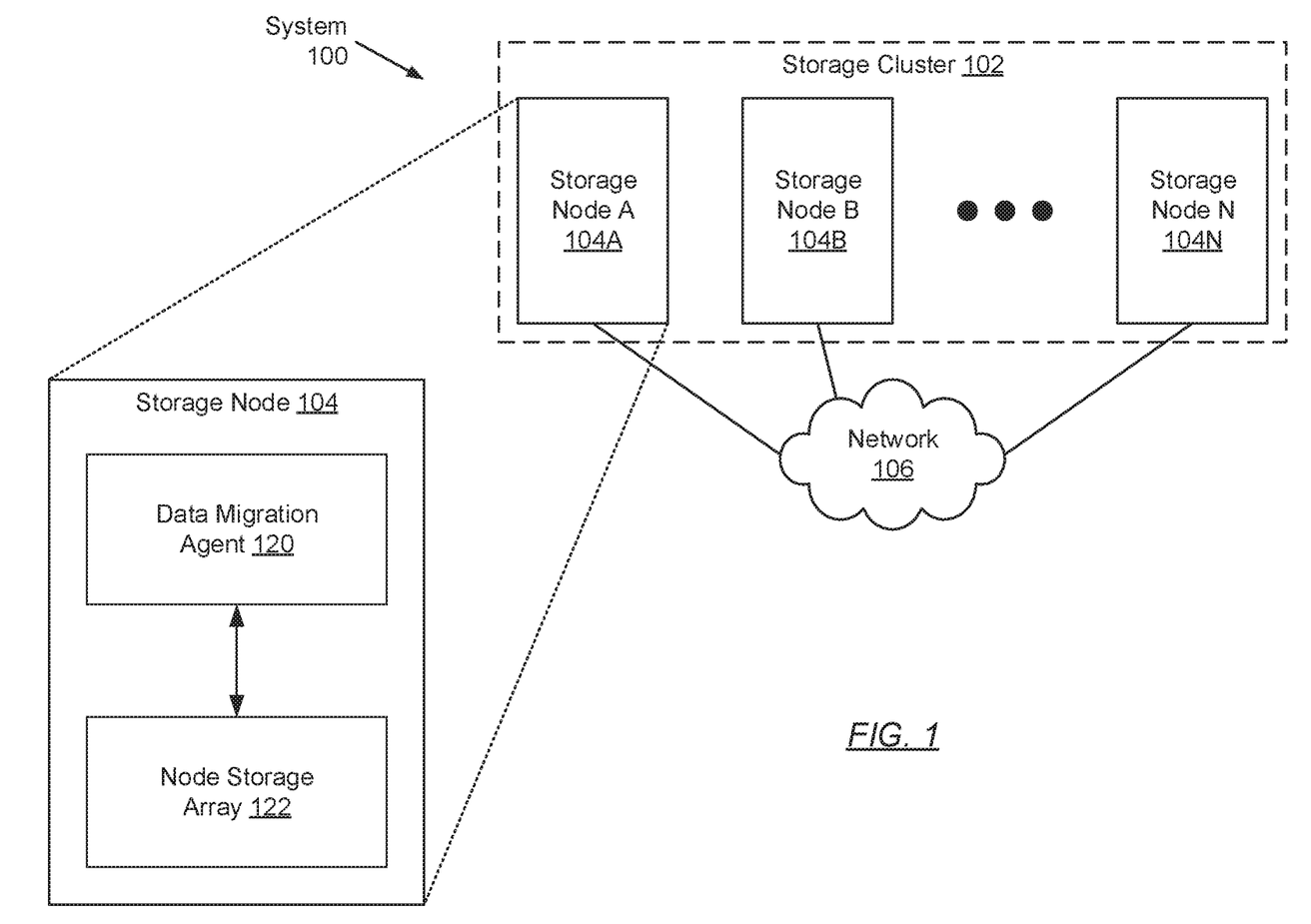
FIG. 1 shows a system in accordance with one or more embodiments of the invention.

FIG. 1 shows a system in accordance with one or more embodiments of the invention. The system (100) may include a collection of two or more storage nodes (104, 104A-104N) (collectively referred to as a storage cluster (102)) operatively connected to one another through a network (106). Each of these system (100) components is described below.

In one embodiment of the invention, the storage cluster (102) may represent a data backup, archiving, and/or disaster recovery storage system, which may service, and thus consolidate various data for, one or more client devices (not shown). Each storage node (104, 104A-104N), of the storage cluster (102), may be implemented using a physical or virtual server, which may reside in a datacenter or a cloud computing environment. Alternatively, each storage node (104, 104A-104N) may be implemented using a computing system similar to the exemplary computing system shown in FIG. 6. Further, each storage node (104, 104A-104N) may be capable of supporting data deduplication (described above).

In one embodiment of the invention, each storage node (104, 104A-104N) may include a data migration agent (120), which may refer to a computer program that may execute on the underlying hardware of the storage node (104, 104A-104N). Specifically, the data migration agent (120) may be responsible for identifying files that dedupe well based on virtual synthetics metadata and, subsequently, re-distribute those identified files from a source storage node to one or more destination storage nodes. The source storage node may represent a storage node (104, 104A-104N) whereon the identified files may reside pre-migration, whereas the destination storage node(s) may represent one or more storage nodes (104, 104A-104N) whereto the identified files are migrated, to implement load balancing across the storage cluster (102). To the extent of the aforementioned responsibilities, the data migration agent (120) may include functionality to perform the various steps outlined in the method flowcharts described in FIGS. 4 and 5, below. Further, the data migration agent (120) may also include functionality to, either on its own or via another agent (not shown) on the storage node (104, 104A-104N), track storage availability across the various storage nodes (104, 104A-104N) of the storage cluster (102). Storage availability may refer to a quantitative measure, expressed as a percentage, of how much of the total storage capacity, across a node storage array (122) (described below) of a given storage node (104, 104A-104N), has not been consumed by data stored thereon. Moreover, one of ordinary skill will appreciate that the data migration agent (120) may perform other functionalities without departing from the scope of the invention.

In one embodiment of the invention, each storage node (104, 104A-104N) may further include a node storage array (122), or a collection of one or more physical storage devices (not shown) on which various forms of data—e.g., data files (which may or may not have undergone data deduplication), virtual synthetics metadata (see e.g., FIG. 2) associated with at least a subset of the data files, etc.—may be consolidated. Each physical storage device may encompass non-transitory computer readable storage media on which data may be stored in whole or in part, and temporarily or permanently. Further, each physical storage device may be implemented based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the node storage array (122) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the various storage nodes (104, 104A-104N), of the storage cluster (102), may operatively connect to one another through the network (106) (e.g., a local area network (LAN), a wide area network (WAN) such as the Internet, a mobile network, any other network type, or a combination thereof). The network (106) may be implemented using any combination of wired and/or wireless connections. Further, the network (106) may encompass various interconnected, network-enabled sub-components (or systems) (e.g., network switches, network routers, network gateways, etc.) that may facilitate communications between the various storage nodes (104, 104A-104N). Moreover, the various storage nodes (104, 104A-104N) may communicate with one another using any combination of wired and/or wireless communication protocols.

While FIG. 1 shows a configuration of components, other system (100) configurations may be used without departing from the scope of the invention.

Figure 2:
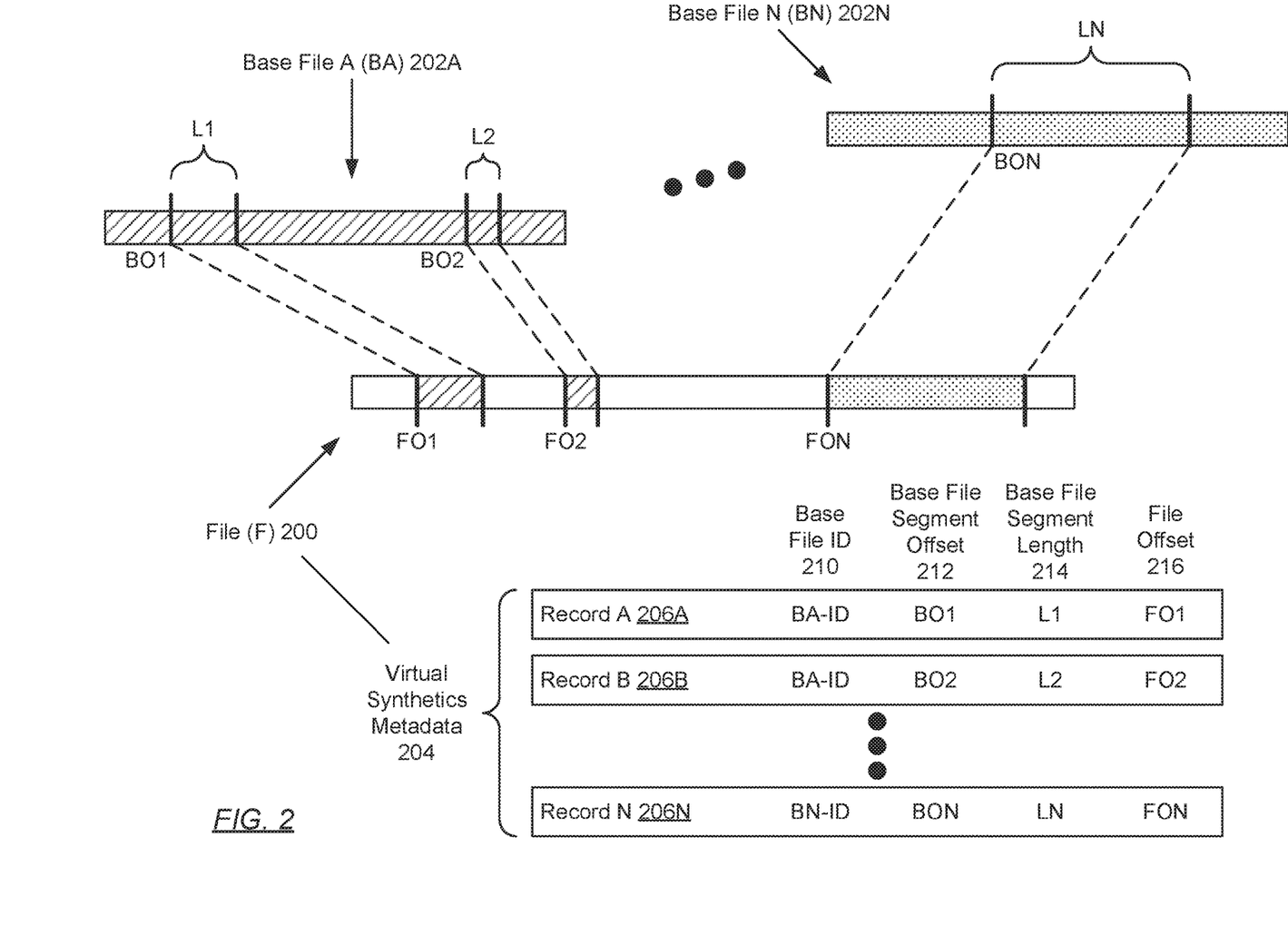
FIG. 2 shows virtual synthetics metadata for a file in accordance with one or more embodiments of the invention.

FIG. 2 shows virtual synthetics metadata for a file in accordance with one or more embodiments of the invention. Virtual synthetics may refer to a storage optimization (or compression) technique whereby data (or files) maintained on a given storage node may be defined, stored, and subsequently recovered, at least in part, using pointers to data blocks (or file segments) from other data (or files) maintained on the given storage node. Through virtual synthetics, similar to data deduplication, the storage of duplicate (or redundant) data blocks (or file segments) may be eliminated, to more efficiently utilize the available storage space on the given storage node, as well as to avoid the unnecessary transfer of duplicate data blocks (or file segments) over the network.

In one embodiment of the invention, any subset of the data (or files) (200), maintained on a given storage node, may have associated virtual synthetics metadata (204). Particularly, should a given data (or file) (200) include at least one data block (or file segment) from one or more other data (or files) (also referred to as base data or base files) (202A-202N), then the given data (or file) (200) may be associated with corresponding virtual synthetics metadata (204). Virtual synthetics metadata (204) may include information describing which data blocks (or file segments) of a given file (200) map to data blocks (or file segments) from one or more base data (or base files) (202A-202N).

More specifically, in one embodiment of the invention, the virtual synthetics metadata (204) for a given file (200) may retain the above-mentioned information, for example, in the form of one or more metadata records (206A-206N). Each metadata record (206A-206N) may pertain to a particular file segment, found in the given file (200), which may map to a file segment with identical content originating in a base file (202A-202N). To that extent, each metadata record (206A-206N) may at least specify: (a) a base file identifier (ID) (210) identifying a given base file (202A-202N); (b) a base file segment offset (212) indicating a base file starting point of a given file segment found in the given base file (202A-202N), where the base file starting point of the given file segment may be measured as a distance (in bytes) from a node storage array address whereat the given base file (202A-202N) may be stored; (c) a base file segment length (214) indicating a length (in bytes) of the given file segment found in the given base file (202A-202N); and (d) a file offset (216) indicating a file starting point of the given file segment found in a given file (200), where the file starting point of the given file segment may be measured as a distance (in bytes) from a node storage array address whereat the given file (200) may be stored.

While FIG. 2 shows a configuration of information descriptive of a file (200), other virtual synthetics metadata (204) configurations may be used without departing from the scope of the invention.

Figure 3:
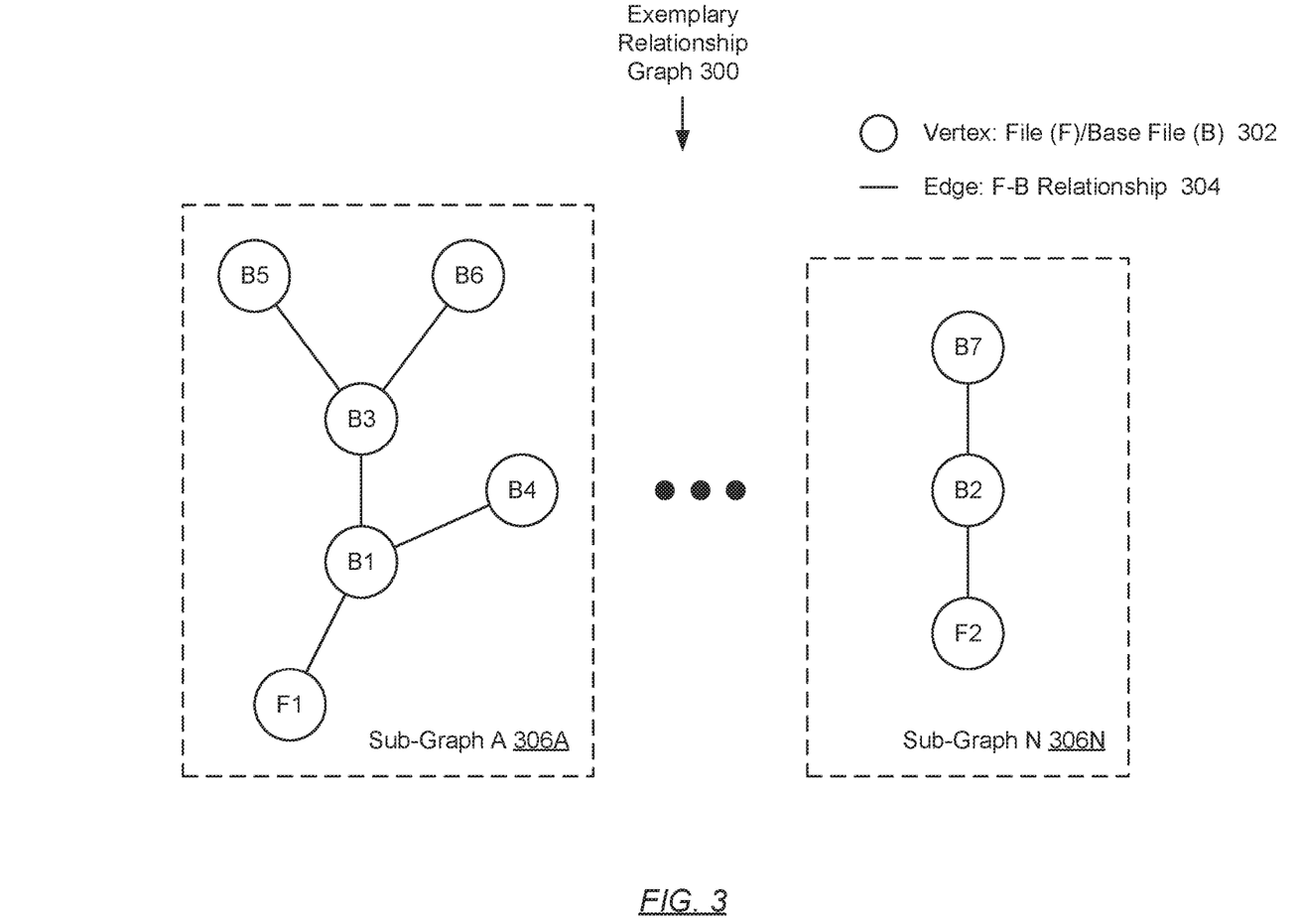
FIG. 3 shows an exemplary relationship graph in accordance with one or more embodiments of the invention.

FIG. 3 shows an exemplary relationship graph in accordance with one or more embodiments of the invention. A relationship graph (300) may refer to a set of vertices (302) connected by a set of edges (304), which may reflect file segment lineages amongst files stored on a given storage node. To that extent, a relationship graph (300) may disclose which files may be defined, at least in part, by file segments from other files. Further, by disclosing the aforementioned, a relationship graph (300) may reveal which sets (or families) of files may dedupe well.

In one embodiment of the invention, each vertex (302) in a relationship graph (300) may represent a file that may be maintained on the given storage node, and that may be associated with virtual synthetics metadata (described above) (see e.g., FIG. 2). Any of these files, which may include at least one file segment that may be used in the definition of at least one other file, may also be referred to as a base file. Furthermore, each edge (304) in a relationship graph (300) may represent the existence of at least one file segment shared between a pair of files.

In one embodiment of the invention, a relationship graph (300) may include two or more sub-graphs (306A-306N) (also referred to as relationship sub-graphs), which may be disconnected from one another. Accordingly, a relationship graph (300) may be defined as a disconnected graph, or a graph in which any edge (304) (or path) between at least one pair of vertices (302) does not exist (e.g., vertices B6 and B7 do not have an edge connecting them together). Each sub-graph (306A-306N), however, may be defined as an independent, connected component of the relationship graph (300). Accordingly, each sub-graph (306A-306N) of a relationship graph (300) may be defined as a connected graph, or a graph in which there exists an edge (304) (or path) between every pair of vertices (302). Further, each sub-graph (306A-306N) may represent a set (or family) of files, which may be connected, at least in part, through file segments shared there-between.

While FIG. 3 shows a configuration of components, other relationship graph (300) configurations may be used without departing from the scope of the invention.

Figure 4:
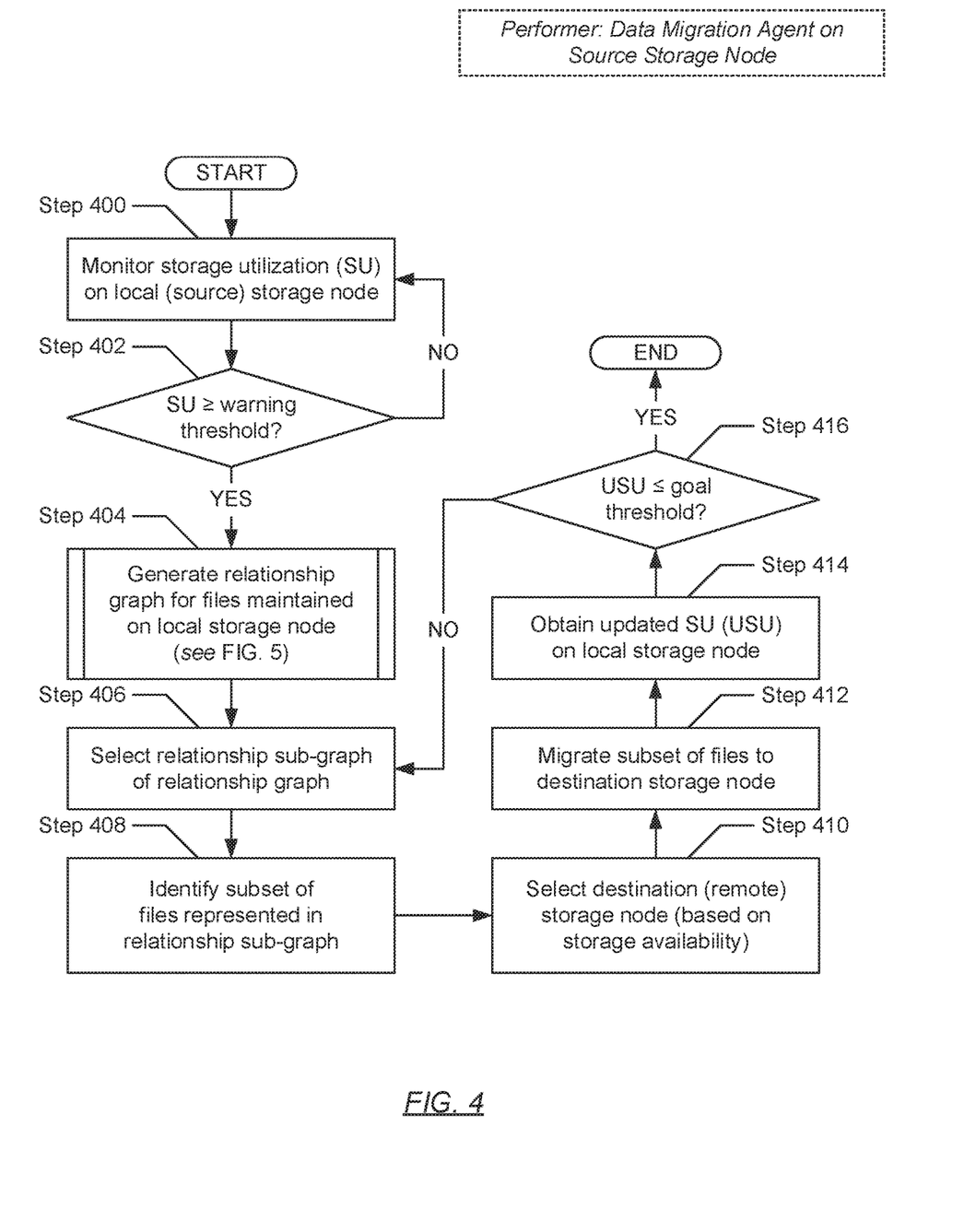
FIG. 4 shows a flowchart describing a method for storage load balancing in accordance with one or more embodiments of the invention.

FIG. 4 shows a flowchart describing a method for storage load balancing in accordance with one or more embodiments of the invention. The various steps outlined below may be performed by the data migration agent (see e.g., FIG. 1) on a source storage node (i.e., a storage node offloading data onto another storage node). Further, while the various steps in the flowchart are presented and described sequentially, one of ordinary skill will appreciate that some or all steps may be executed in different orders, may be combined or omitted, and some or all steps may be executed in parallel.

Turning to FIG. 4, in Step 400, storage utilization on the source (or local) storage node is monitored. In one embodiment of the invention, storage utilization may refer to a quantitative measure, expressed as a percentage, of how much of the total storage capacity, across a node storage array (see e.g., FIG. 1) of the source storage node, has been consumed by data stored thereon. Further, the storage utilization on the source storage node may steadily increase over time as data is ingested, for storage, from one or more client devices; or as data is re-distributed to at least the source storage node from one or more other storage nodes for load balancing purposes.

In Step 402, a determination is made as to whether the storage utilization (monitored in Step 400) at least meets a warning threshold. The warning threshold may refer to a configurable storage utilization percentage (e.g., 90%), which may mark a need to offload or re-distribute data from the source storage node. To that extent, in one embodiment of the invention, if it is determined that the monitored storage utilization meets or exceeds the warning threshold, then the process proceeds to Step 404. On the other hand, in another embodiment of the invention, if is alternatively determined that the monitored storage utilization falls short of the warning threshold, then the process alternatively returns to Step 400, where storage utilization on the source storage node continues to be monitored.

In Step 404, following the determination (in Step 402) that the storage utilization (monitored in Step 400) at least meets the above-mentioned warning threshold, a relationship graph is generated. In one embodiment of the invention, the relationship graph may refer to a set of vertices connected by a set of edges, which may reflect file segment lineages amongst files maintained on the source storage node. Generation of the relationship graph is described in further detail in FIG. 5, below.

In Step 406, a relationship sub-graph of the relationship graph (generated in Step 404) is selected. In one embodiment of the invention, a relationship sub-graph may refer to a connected component (or portion) of the relationship graph (see e.g., FIG. 3). In Step 408, a subset of the files, maintained on the source storage node, is identified. Specifically, in one embodiment of the invention, the aforementioned subset of files may map to the subset of vertices that form the relationship sub-graph (selected in Step 408).

In Step 410, a destination (or remote) storage node is selected. In one embodiment of the invention, selection of the destination storage node may, for example, rely on storage availability across the various storage nodes of the storage cluster. Storage availability may refer to a quantitative measure, expressed as a percentage, of how much of the total storage capacity, across a node storage array (see e.g., FIG. 1) of a given storage node, has not been consumed by data stored thereon. By way of an example, the remote storage node with a highest storage availability percentage may be selected as the destination storage node.

In Step 412, the subset of files (identified in Step 408) are migrated to the destination storage node (selected in Step 410). Thereafter, in Step 414, an updated storage utilization (described above) of the source storage node is obtained. In one embodiment of the invention, the updated storage utilization, expressed as a percentage, may reflect how much of the total storage capacity, across the node storage array of the source storage node, is being consumed by the remaining data stored thereon. The remaining data excludes the subset of files (migrated in Step 412).

In Step 416, a determination is made as to whether the updated storage utilization (obtained in Step 414) meets or falls short of a goal threshold. The goal threshold may refer to a configurable storage utilization percentage (e.g., 60%), which may mark a termination to the re-distribution of data from the source storage node. To that extent, in one embodiment of the invention, if it is determined that updated storage utilization equals or is less than the goal threshold, then the process ends. On the other hand, in another embodiment of the invention, if it is alternatively determined that the updated storage utilization exceeds the goal threshold, then the process alternatively proceeds to Step 406, where another relationship sub-graph of the relationship graph (generated in Step 404) is selected.

Figure 5:
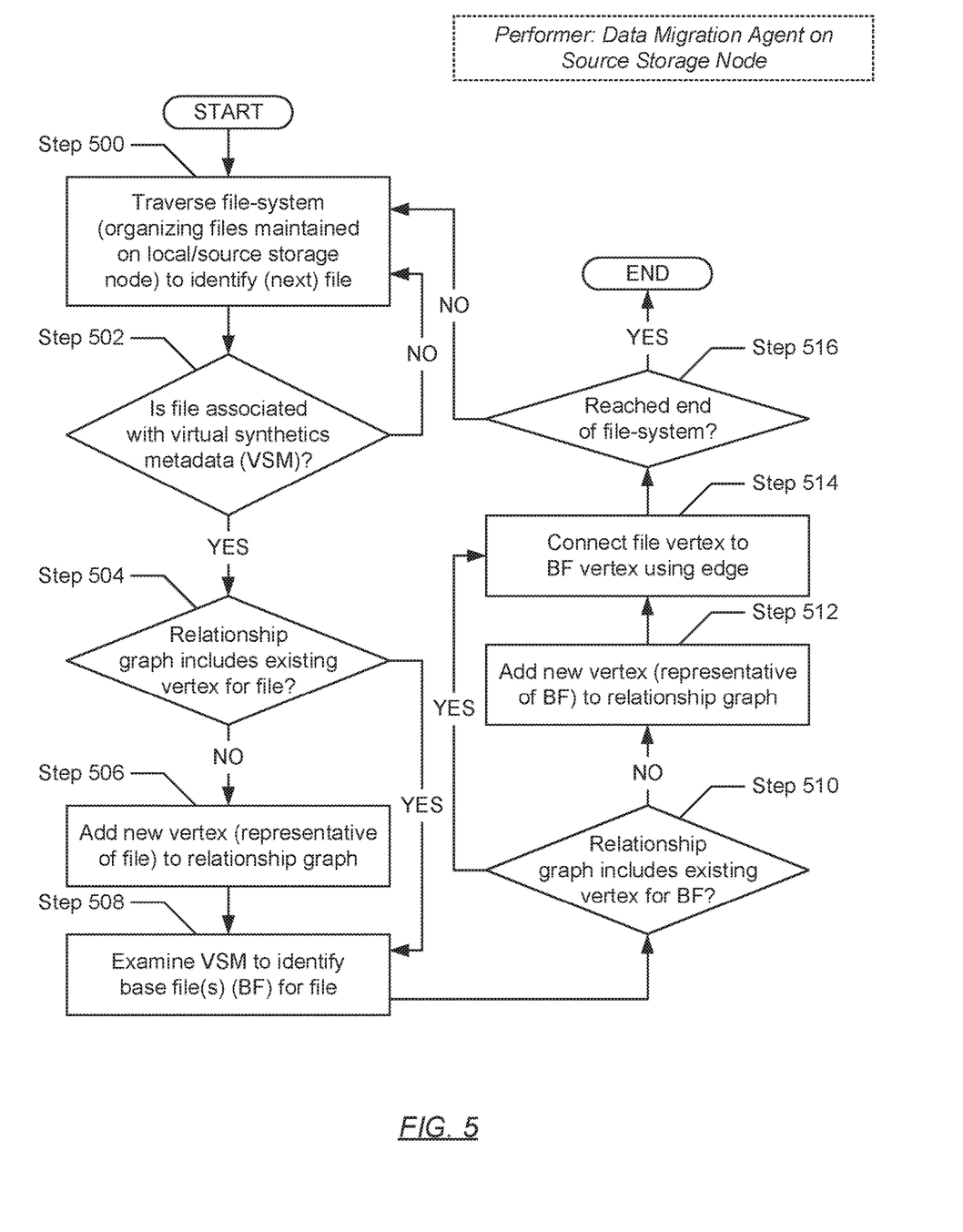
FIG. 5 shows a flowchart describing a method for generating a relationship graph in accordance with one or more embodiments of the invention.

FIG. 5 shows a flowchart describing a method for generating a relationship graph in accordance with one or more embodiments of the invention. The various steps outlined below may be performed by the data migration agent (see e.g., FIG. 1) on a source storage node (i.e., a storage node offloading data onto another storage node). Further, while the various steps in the flowchart are presented and described sequentially, one of ordinary skill will appreciate that some or all steps may be executed in different orders, may be combined or omitted, and some or all steps may be executed in parallel.

Turning to FIG. 5, in Step 500, a file-system is traversed in order to identify a file. In one embodiment of the invention, the file-system may refer to a data structure through which files, maintained on the source (local) storage node, may be organized. By way of an example, the file-system may organize files in the form of a hierarchical tree, whereby traversing the hierarchical tree may entail employing any existing depth first search or breadth first search algorithm.

In Step 502, a determination is made as to whether the file (identified in Step 500) is associated with virtual synthetics metadata (described above) (see e.g., FIG. 2). Accordingly, in one embodiment of the invention, if it is determined that the file has associated virtual synthetics metadata, then the process proceeds to Step 504. On the other hand, in another embodiment of the invention, if it is alternatively determined that the file does not have any associated virtual synthetics metadata, then the process returns to Step 500, where traversing of the above-mentioned file-system may continue in order to identify another file.

In Step 504, following the determination (in Step 502) that the file (identified in Step 500) is associated with virtual synthetics metadata, another determination is made as to whether the relationship graph includes an existing vertex representative of the file. In one embodiment of the invention, if it is determined that the relationship graph excludes a vertex representative of the file, then the process proceeds to Step 506. On the other hand, in another embodiment of the invention, if it is alternatively determined that the relationship graph does include an existing vertex representative of the file, then the process alternatively proceeds to Step 508.

In Step 506, following the determination (in Step 504) that the relationship graph excludes a vertex representative of the file (identified in Step 500), a new vertex—representative of the file—is added thereto. Thereafter, in Step 508, following the addition of the new vertex (in Step 506) or following the determination (in Step 504) that the relationship graph already includes a vertex representative of the file (identified in Step 500), the virtual synthetics metadata, associated with the file, is examined. In one embodiment of the invention, examination of the virtual synthetics metadata may yield the identification of one or more base files of the file. A base file may refer to any other file, which may include at least one file segment that may be used in the definition of the file (see e.g., FIG. 2).

In Step 510, for each base file (identified in Step 508), a determination is made as to whether the relationship graph includes an existing vertex representative of the base file. In one embodiment of the invention, if it is determined that the relationship graph excludes a vertex representative of the base file, then the process proceeds to Step 512. On the other hand, in another embodiment of the invention, if it is alternatively determined that the relationship graph does include an existing vertex representative of the base file, then the process alternatively proceeds to Step 514.

In Step 512, for each base file (identified in Step 508), following the determination (in Step 510) that the relationship graph excludes a vertex representative of the base file, a new vertex—representative of the base file—is added thereto. Thereafter, in Step 514, for each base file (identified in Step 508), following the addition of the new vertex (in Step 512) or following the determination (in Step 510) that the relationship graph already includes a vertex representative of the base file, an edge (or path) is added connecting the vertices representative of the base file and the file (identified in Step 500).

In Step 516, a determination is made as to whether an end of the file-system has been reached. In one embodiment of the invention, if it is determined that the file-system has been completely traversed, then the process ends. On the other hand, in another embodiment of the invention, if it is alternatively determined that the end of the file-system has not yet been reached, then the process alternatively proceeds to Step 500, where traversing of the file-system may continue in order to identify another file.

Figure 6:
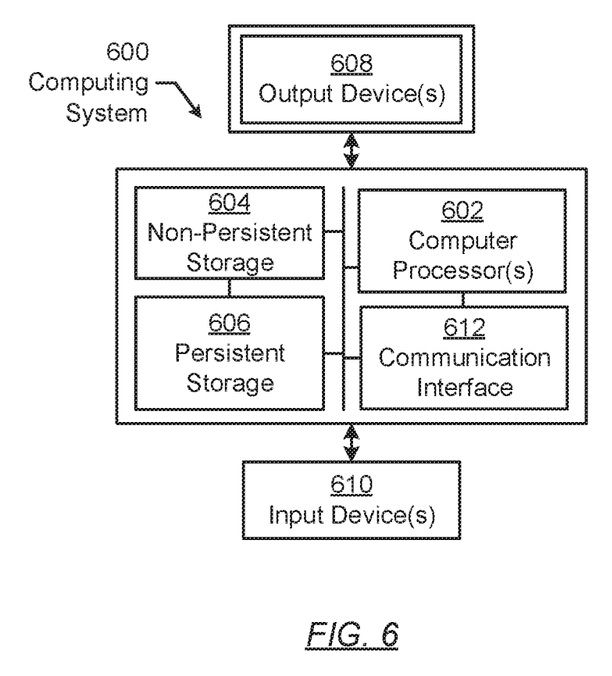
FIG. 6 shows an exemplary computing system in accordance with one or more embodiments of the invention.

FIG. 6 shows an exemplary computing system in accordance with one or more embodiments of the invention. The computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a central processing unit (CPU) and/or a graphics processing unit (GPU). The computing system (600) may also include one or more input devices (610), such as a touchscreen, keyboard, mouse, microphone, touchpad, electronic pen, or any other type of input device. Further, the communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

In one embodiment of the invention, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for storage load balancing between storage nodes, comprising:
    monitoring a storage utilization on a source storage node;
    making a first determination that the storage utilization at least meets a warning threshold;
    generating, based on the first determination and from virtual synthetics metadata, a relationship graph for files maintained on the source storage node;
    identifying a first subset of the files based on the relationship graph; and
    migrating the first subset of the files to a destination storage node.

2. The method of claim 1, wherein the virtual synthetics metadata for a file comprises at least one metadata record, wherein each metadata record of the at least one metadata record comprises information mapping a first file segment of the file to a second file segment of a base file, wherein the first and second file segments comprise identical content.

3. The method of claim 2, wherein the information comprises a base file identifier associated with the base file, a base file segment offset for the second file segment, a base file segment length for the second file segment, and a file offset for the first file segment.

4. The method of claim 1, wherein the relationship graph is a disconnected graph comprising at least two independent sub-graphs, wherein each sub-graph is a connected graph.

5. The method of claim 1, wherein generating the relationship graph for files maintained on the source storage node from the virtual synthetics metadata, comprises:
    for each file associated with the virtual synthetics metadata, of the files maintained on the source storage node:
        adding, if not existing already, a first vertex representative of the file to the relationship graph;
        examining the virtual synthetics metadata associated with the file to identify at least one base file;
        adding, for each base file of the at least one base file and if not existing already, a second vertex representative of the base file to the relationship graph; and
        adding, for each base file of the at least one base file, an edge connecting the first vertex to the second vertex.

6. The method of claim 1, wherein identifying the first subset of the files based on the relationship graph, comprises:
    selecting a relationship sub-graph of the relationship graph; and
    identifying, for each vertex forming the relationship sub-graph, a file being represented by the vertex.

7. The method of claim 1, further comprising:
    obtaining an updated storage utilization for the source storage node;
    making a second determination that the updated storage utilization exceeds a goal threshold;
    identifying, based on the second determination, a second subset of the files based on the relationship graph; and
    migrating the second subset of the files to the destination storage node.

8. A non-transitory computer readable medium (CRM) comprising computer readable program code, which when executed by a computer processor, enables the computer processor to:
    monitor a storage utilization on a source storage node;
    make a first determination that the storage utilization at least meets a warning threshold;
    generate, based on the first determination and from virtual synthetics metadata, a relationship graph for files maintained on the source storage node;
    identify a first subset of the files based on the relationship graph; and
    migrate the first subset of the files to a destination storage node.

9. The non-transitory CRM of claim 8, wherein the virtual synthetics metadata for a file comprises at least one metadata record, wherein each metadata record of the at least one metadata record comprises information mapping a first file segment of the file to a second file segment of a base file, wherein the first and second file segments comprise identical content.

10. The non-transitory CRM of claim 9, wherein the information comprises a base file identifier associated with the base file, a base file segment offset for the second file segment, a base file segment length for the second file segment, and a file offset for the first file segment.

11. The non-transitory CRM of claim 8, wherein the relationship graph is a disconnected graph comprising at least two independent sub-graphs, wherein each sub-graph is a connected graph.

12. The non-transitory CRM of claim 8, further comprising computer readable program code to generate the relationship graph, which when executed by the computer processor, further enables the computer processor to:
for each file associated with the virtual synthetics metadata, of the files maintained on the source storage node:
add, if not existing already, a first vertex representative of the file to the relationship graph;
examine the virtual synthetics metadata associated with the file to identify at least one base file;
add, for each base file of the at least one base file and if not existing already, a second vertex representative of the base file to the relationship graph; and
add, for each base file of the at least one base file, an edge connecting the first vertex to the second vertex.

13. The non-transitory CRM of claim 8, further comprising computer readable program code to identify the first subset of the files, which when executed by the computer processor, further enables the computer processor to:
select a relationship sub-graph of the relationship graph; and
identify, for each vertex forming the relationship sub-graph, a file being represented by the vertex.

14. The non-transitory CRM of claim 8, further comprising computer readable program code, which when executed by the computer processor, further enables the computer processor to:
obtain an updated storage utilization for the source storage node;
make a second determination that the updated storage utilization exceeds a goal threshold;
identify, based on the second determination, a second subset of the files based on the relationship graph; and
migrate the second subset of the files to the destination storage node.

15. A system, comprising:
a plurality of storage nodes, comprising:
a destination storage node; and
a source storage node operatively connected to the destination storage node, and comprising a computer processor,
wherein a data migration agent executes on the computer processor and is programmed to:
monitor a storage utilization on the source storage node;
make a first determination that the storage utilization at least meets a warning threshold;
generate, based on the first determination and from virtual synthetics metadata, a relationship graph for files maintained on the source storage node;
identify a first subset of the files based on the relationship graph; and
migrate the first subset of the files to the destination storage node.

16. The system of claim 15, wherein the virtual synthetics metadata for a file comprises at least one metadata record, wherein each metadata record of the at least one metadata record comprises information mapping a first file segment of the file to a second file segment of a base file, wherein the first and second file segments comprise identical content.

17. The system of claim 16, wherein the information comprises a base file identifier associated with the base file, a base file segment offset for the second file segment, a base file segment length for the second file segment, and a file offset for the first file segment.

18. The system of claim 15, wherein the relationship graph is a disconnected graph comprising at least two independent sub-graphs, wherein each sub-graph is a connected graph.

19. The system of claim 15, wherein to identify the first subset of the files, the data migration agent is further programmed to:
select a relationship sub-graph of the relationship graph; and
identify, for each vertex forming the relationship sub-graph, a file being represented by the vertex.

20. The system of claim 15, wherein the data migration agent is further programmed to:
obtain an updated storage utilization for the source storage node;
make a second determination that the updated storage utilization exceeds a goal threshold;
identify, based on the second determination, a second subset of the files based on the relationship graph; and
migrate the second subset of the files to the destination storage node.

* * * * *